Aug. 5, 1958

A. C. SCHROEDER 2,846,574

MATRIXING APPARATUS

Filed Dec. 14, 1953

3 Sheets-Sheet 1

INVENTOR.
Alfred C. Schroeder

BY [signature]

ATTORNEY

Aug. 5, 1958 | A. C. SCHROEDER | 2,846,574

MATRIXING APPARATUS

Filed Dec. 14, 1953 | 3 Sheets-Sheet 2

INVENTOR.
Alfred C. Schroeder

BY [signature]

ATTORNEY

INVENTOR.
Alfred C. Schroeder
BY [signature]
ATTORNEY

United States Patent Office 2,846,574

Patented Aug. 5, 1958

2,846,574

MATRIXING APPARATUS

Alfred C. Schroeder, Huntingdon Valley, Pa., assignor to Radio Corporation of America, a corporation of Delaware Application December 14, 1953, Serial No. 398,095

11 Claims. (Cl. 250—27)

Figures 1, 3:
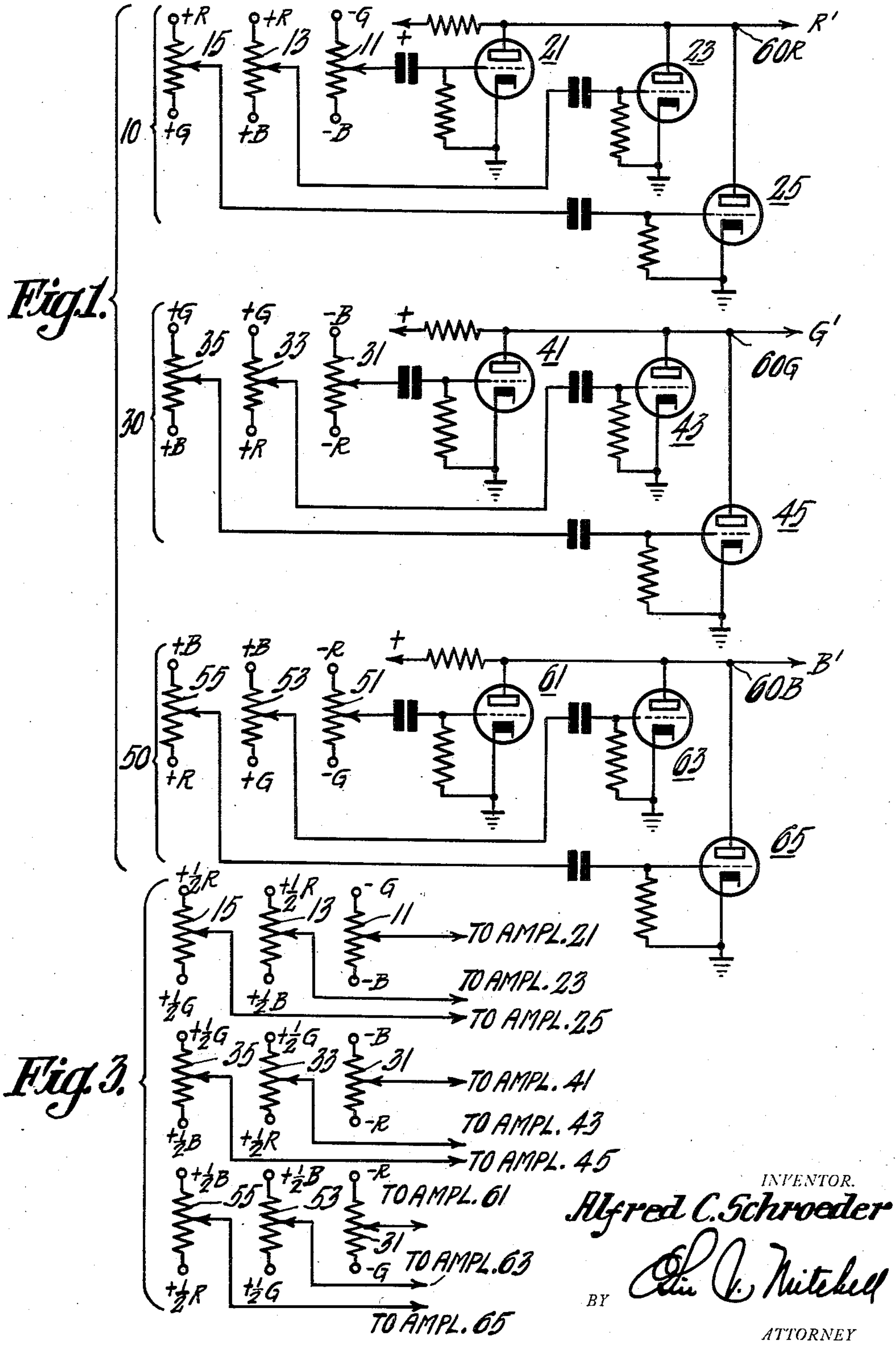

This invention relates generally to amplifying apparatus, and more particularly to amplifiers of the so-called matrixing type.

In signalling systems, such as color television systems, particularly of the so-called simultaneous type, it is often desirable or necessary to provide apparatus for effecting controlled mixing of individual component signals, such as the component color signals representative of different color aspects of an image in such a television system. For example, the signal specifications proposed by the NTSC (National Television Systems Committee) to the FCC for adoption as color television signal standards call for the formation of various signals which are mixtures of respective component color signals in predetermined proportions and polarities. More specifically, such mixture signals include so-called "I" and "Q" signals which correspond respectively to the following mixtures:

$$.60E_R-.28E_G-.32E_B;\ .21E_R-.52E_G+.31E_B$$

where $E_R$, $E_G$ and $E_B$ are the gamma-corrected voltages corresponding to the red, green and blue signals intended for the color picture tube. The aforementioned signal specifications also call for the formation of a so-called "Y" signal, the monochrome portion of the color picture signal, which corresponds to the following mixture of component color signals:

$$.30E_R+.59E_G+.11E_B$$

To permit formation of the aforementioned I, Q and Y signals from appropriate red, green and blue signals, apparatus must be provided which is capable of combining the respective component color signals with appropriate polarities and relative amplitudes. Such mixture signal forming is generally known as matrixing, and amplifying apparatus providing such operation is generally referred to as a matrixing amplifier.

The present invention is concerned with apparatus of the matrixing amplifier type. In particular, embodiments of the present invention, which shall be subsequently discussed in detail, provide matrixing amplifiers which have significant advantages in use for performing so-called "masking" operations in a color television system. While the term "masking" has a well-known meaning in the color photography art and has a more or less analogous meaning in the color television art, it may be advantageous to briefly explain the function of "masking" in a color television system. In any color television system there are two basic terminal operations: the derivation of color information from an image by appropriate pickup apparatus, and the reproduction of said image from said color information by suitable image reproducing apparatus. The pickup operation generally requires the analysis of light from the image into specific component colors, while the image reproducing operation generally requires reproduction of the image in specific component colors, which are combined in one manner or another to duplicate the appearance of the original image to a viewer. It may well be appreciated that if the image information supplied to the image reproducer is in terms of component colors other than the component colors which the reproducer employs to reconstruct the image, a faithful reproduction of the original image will not be achieved. Thus, if the primary colors in which the pickup apparatus analyzes light from the subject image do not correspond to the primary colors in which the reproducer establishes component images, the system must provide means for converting the originally derived color information into terms of the reproducer primaries if faithful reproductions are to be achieved. Conversion may be effected by suitable mixing of the signals originally derived to provide mixture signals which substantially correspond to the reproducer primaries, i. e. the information contained in the respective mixture signals corresponds substantially to the information which would have been obtained had the pickup analysis of light from the image been originally in terms of the reproducer primaries. This effective shifting of "taking" primaries is referred to as "masking" in analogy to masking steps used in color photography for similar primary shifting purpose.

In accordance with an embodiment of the present invention apparatus is provided for mixing component color signals in appropriate proportions and with appropriate polarities, wherein mixture adjustments may be effected with optimum convenience. More specifically, in accordance with embodiments of the present invention matrixing amplifiers are provided which are always "white balanced" irrespective of component color signal proportion adjustments. In this regard, it may be noted that where masking amplifiers are used in color television systems for converting respective color signals representative of a first set of primaries to color signals representative of a second set of primaries, it is necessary that the respective output signals of the masking amplifier be balanced for signals representative of white or "gray" shadings thereof. That is, when light from the subject image corresponds in color to the color determined as "white" for the system, each of the respective signal outputs of the masking amplifier must be substantially equal. In matrixing or masking amplifiers heretofore known, the necessity of "white balancing" rendered the adjustment of input signal proportions to obtain a particular mixture signal output a rather laborious process, since adjustment of one input component for any one output channel required an accompanying compensating adjustment of at least one other input component for that output channel (or else appropriate adjustments for all of the other output channels) in order that the respective outputs remain balanced for white signals. In accordance with the present invention such interdependence of adjustments for maintaining white balance is eliminated, and adjustment operations are thereby simplified.

Accordingly it is a primary object of the present invention to provide novel and improved means for selectively effecting mixtures of different component signals in a signalling system.

It is a further object of the present invention to provide an improved matrixing network whereby matrix adjustments are simplified.

It is another object of the present invention to provide a color television system with an improved masking amplifier which is balanced for white signals irrespective of adjustments of input signal proportions and polarities.

It is an additional object of the present invention to provide a color television system with a masking amplifier in which adjusting operations are simplified by provision for a "constant white" output.

Other objects and advantages of the present invention will become readily apparent to those skilled in the art upon a reading of the following detailed description and an inspection of the accompanying drawings in which:

Figure 1 illustrates schematically a portion of a matrixing amplifier embodying the principles of the present invention.

Figure 2A:
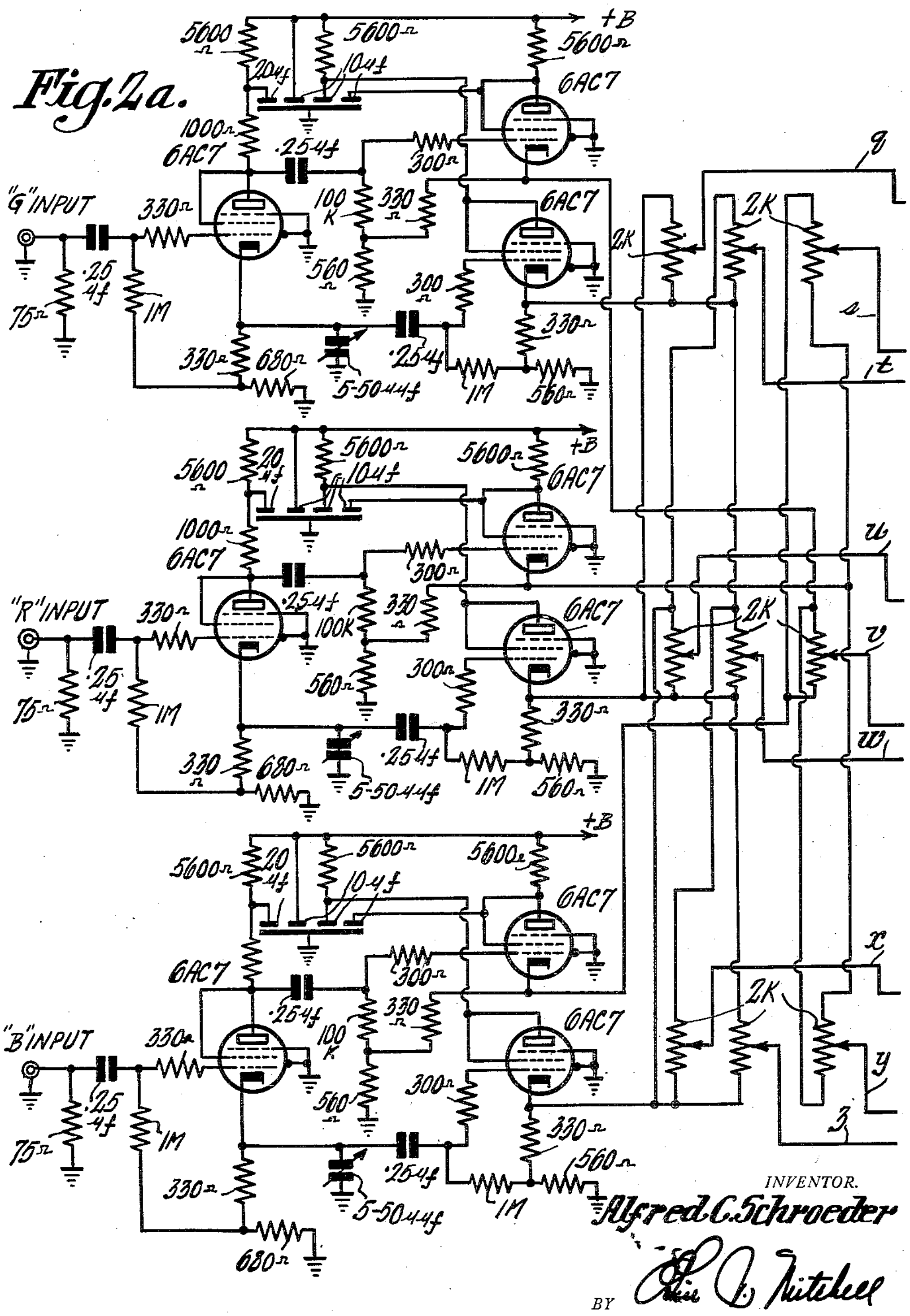
Figure 2B:
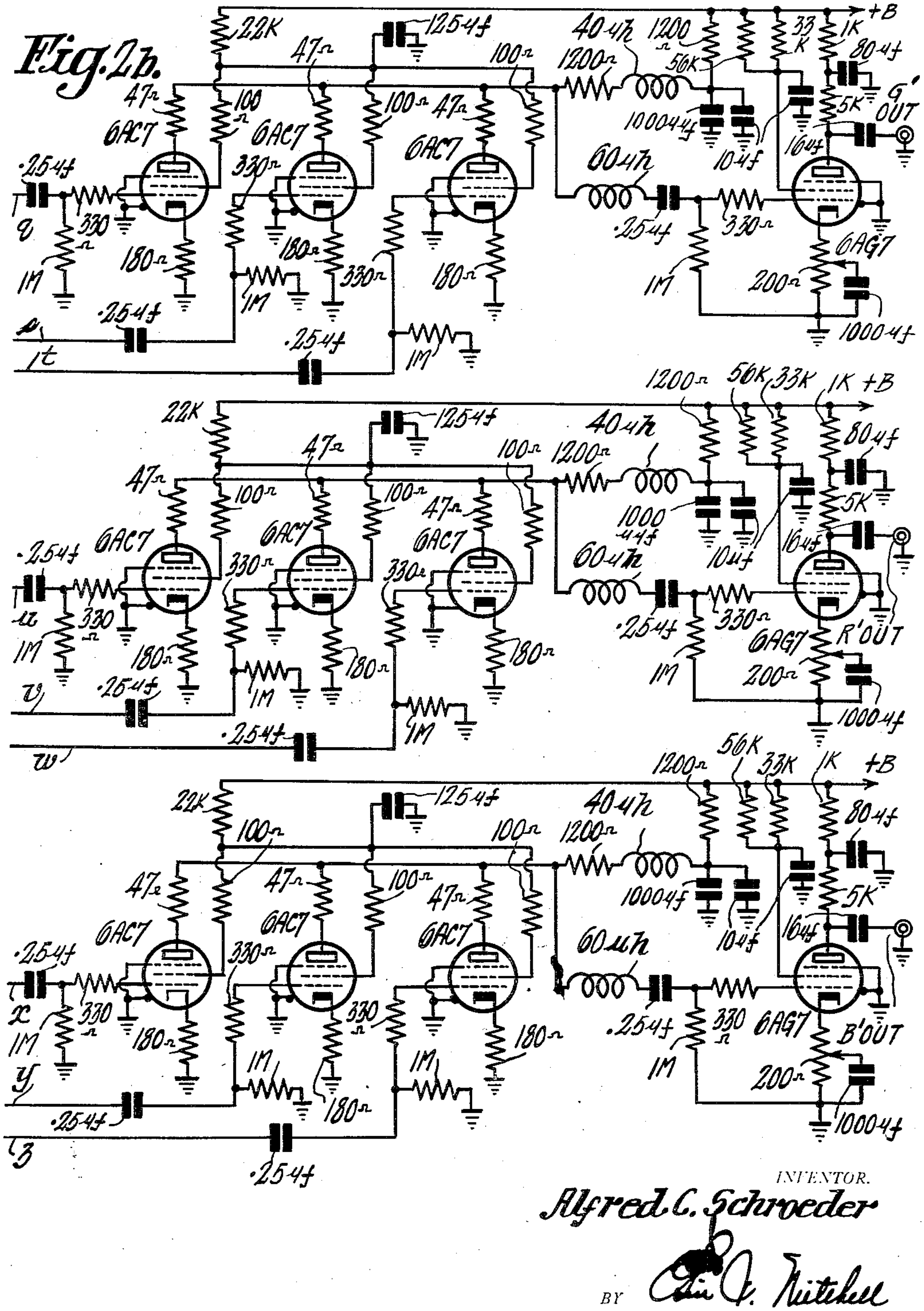

Figures 2*a* and 2*b* illustrate schematically a complete masking amplifier in accordance with the embodiment of the invention illustrated in Figure 1; and Figure 3 illustrates a modification of the embodiment of the invention illustrated in the preceding figures.

Referring to Figure 1 in greater detail, a portion of a matrixing amplifier in accordance with an embodiment of the present invention is illustrated schematically. In order to simplify the schematic diagram and more clearly point up the novelty of the present invention with a minimum of confusion, input signal sources have been omitted from the figure and the terminals of the respective input signal potentiometers have been appropriately labeled with symbols such as +R, —G, —B etc. to indicate the input signal and polarity thereof appropriate to the respective terminals. Thus, it may be assumed that the illustrated networks operate in a color television signalling system provided with a plurality of component color signals, which shall be referred to as R, G and B signals. R, G and B may be assumed to be respectively representative of an image in terms of a first predetermined set of primaries. Thus, for example, the R, G and B signals may be the respective component color signals derived from the "red," "green" and "blue" pickup tubes of a simultaneous color camera of a well-known type. It may also be assumed that it is desired to derive from these R, G and B signals a second set of signals which correspond to respective predetermined mixtures of the R, G and B signals. The purpose of such mixing may be, for example, the previously discussed "masking," whereby it is desired to convert the color information derived by the color camera into terms of a second predetermined set of primaries, which may be referred to as R′, G′ and B′ and which more closely approximate the "red," "green" and "blue" primaries of an image reproducer.

The matrixing amplifier illustrated in Figure 1 may be considered as divided into three output signal channels an R′-output channel 10, a G′-output channel 30, and a B′-output channel 50. Each of the channels 10, 30 and 50 is provided with a trio of input voltage dividers, namely input signal potentiometers 11, 13 and 15, 31, 33 and 35; and 51, 53 and 55, respectively. Each channel is provided with a corresponding trio of amplifiers, namely amplifiers 21, 23 and 25 in the R′ output channel, amplifiers 41, 43 and 45 in the G′ output channel, and amplifiers 61, 63 and 65 in the B′ output channel. An input electrode of each amplifier is coupled via an adjustable potentiometer tap to a respective one of the input signal potentiometers of its channel. The output electrodes of the three amplifiers in each output channel are tied to a common output terminal, namely 60R in the R′ output channel, 60G in the G′ output channel, and 60B in the B′ output channel.

The arrangement as thus far described bears a close resemblance to the more or less conventional arrangements employed in matrixing amplifiers heretofore. A point of departure from the teachings of the prior art may however now be noted. In conventional matrixing practice the input signal potentiometers of each channel would be provided with R signals (+ and —), G signals (+ and —), and B signals (+ and —), respectively. That is, for each output channel, the R, G and B signals are separately applied via respective input dividers, generally potentiometers having +R, —R; +G, —G; and +B, —B terminal connections, respectively. It may be readily appreciated that the amplitude of the signal output of each channel for "white" information is directly dependent upon the potentiometer tap settings in such a matrixing system, since the potential is different at all points on each of the potentiometers, even for white information. Hence, there is the inability to maintain "white balance" if any given potentiometer tap setting is changed without a compensatory change of the setting of at least one other potentiometer tap.

In contrast, let us examine the matter of signal application to the input potentiometers of the present invention as indicated in Figure 1. It may be noted that no input signal is applied to just one potentiometer in a channel as in the prior art nor do any of the potentiometers receive just one of the input signals as in the prior art. On the contrary, each of the two fixed terminals of a potentiometer is connected to a respectively different input signal source.

It may be noted that the indications of input signal source connections on the drawing are accompanied by a polarity indicative sign. Thus, it should be assumed that the input signal sources with which the channels 10, 30 and 50 are associated are provided with appropriate phase splitting and shifting means whereby each of the R, G and B signals are available for utilization in mutually opposite polarities at respective "plus" or "minus" output terminals.

Now to observe the specific input source connections as illustrated, it is seen that the upper terminal of potentiometer 11 is supplied with —G signals and the lower terminal thereof supplied with —B signals, the upper terminal of potentiometer 13 is supplied with +R signals while the lower terminal thereof is supplied with +B signals, and the upper terminal of potentiometer 15 is supplied with +R signals while the lower terminal thereof is suplied with +G signals.

It may be observed that with the respective potentiometer taps in the channel 10 set at the potentiometer mid-points, the output signals derived from the common output terminal 60R correspond to the sum of $$\tfrac{1}{2}R+\tfrac{1}{2}G+\tfrac{1}{2}R+\tfrac{1}{2}B-\tfrac{1}{2}G-\tfrac{1}{2}B$$

which is equal to the input signal R. Thus, in the absence of change of the tap settings from the potentiometer mid-points the channel 10 provides an R′ output which is essentially an unmodified R signal. However, where it is desired to provide an R′ output comprising some selected mixture of G and B signals with the R signal, the tap settings may be appropriately changed from their mid-point settings to vary the mixture proportions as desired.

As previously pointed out, however, it is desirable that the mixture signal output of channel 10 as well as the other channels remain essentially constant for white signal information despite changes in mixture proportions via adjustments of the potentiometer taps. Such a result is obtained in accordance with the present invention and may be readily demonstrated. When the input signals R, G and B are representative of the white information, R, G and B are all substantially equal. Hence, the potentials applied to both the upper and lower terminals of each of the potentiometers are equal to each other, and therefore the potential at the tapped point on the potentiometer is the same no matter what the tap setting is. Thus, the potential at the taps of potentiometers 13 and 15, irrespective of their settings, will be equal to each other and to the common signal level of the R, G and B signals, while the potential at the tap of potentiometer 11, irrespective of its setting, will be at a corresponding level but in the opposite polarity. Thus, at the output terminal 60R the effect of the signal from potentiometer 11 will always cancel the effect of one of the similar signals derived from potentiometers 13 and 15 and the net result will be the appearance of an output signal always corresponding to the common input signal.

From the above explanation of the R′ output channel 10, it may be appreciated that the provision of a —B, —R potentiometer 31, a +G, +R potentiometer 33 and a +G, +B potentiometer 35 in the G′ output channel 30, and the provision of a −R, −G potentiometer 51, a +B, +G potentiometer 53 and a +B, +R potentiometer 55 in the B′ output channels 50 gives comparable results. That is, when the respective potentiometer taps are at mid-point settings, the signals appearing at the output channels 60G and 60B respectively correspond to input signals G and R. Change of tap settings therefrom effect mixtures of the input signals in proportions as desired for the G′ and B′ outputs. Also, irrespective of the settings of any of the respective potentiometer taps, the output signals appearing at terminals 60G and 60B for white image information remain equal to each other and to the output at terminal 60R and correspond to the common signal appearing in each input signal source.

Referring to Figures 2*a* and 2*b*, which are to be considered together, a matrixing amplifier suitable for masking purposes is shown in essentially complete schematic detail. Respective G′, R′ and B′ output channels are illustrated corresponding in principle to those illustrated in Figure 1 and incorporating respective output amplifying stages. The input signal sources which supply the input component color signals to the appropriate potentiometer terminals in appropriate polarity are illustrated as including respective phase splitters for providing the mutually opposite phases of the respective input signals desired for application to the potentiometer terminals. Each of the phase splitters is illustrated as including a vacuum tube receiving a respective one of the R, G and B input signals at its control electrode and providing mutually opposite phases of the respective signal at its plate and cathode. It may be observed that the mutually opposite phases of the input color signals are not directly applied from plate and cathode to the appropriate potentiometer terminals, but rather there is provided a separate amplifying stage for each of the phases, each of the potentiometer terminals being directly coupled to a cathode of the appropriate phase handling amplifying stage. The provision of these latter amplifying stages in the illustrated embodiment is effected so that the driving impedances for all of the potentiometers may be substantially equivalent.

In Figures 2*a* and 2*b* various values of resistance, capacity, inductance, and voltage as well as specific tube types, have been designated for the illustrated elements, since apparatus employing elements of such values has been found to provide satisfactory operation. However it should not be assumed that these values are in any way critical, and it will be appreciated that details and specific values in Figures 2*a* and 2*b* are given by way of example only and are not intended to restrict in any way the scope of the present invention.

Figure 3 is illustrative of a modification of the embodiment of the present invention illustrated in the previously discussed figures. For certain purposes in a color television system it may be desired that a matrixing amplifier provide respective output signals which are in the nature of a so-called color-difference signals. The I and Q signals previously discussed are signals of such a nature. In a matrixing amplifier which provides color-difference signal outputs, it is requisite that the output of each channel always equal zero for white signal information. The modification of input signal application to the potentiometers of each channel as illustrated in Figure 3 provides such "zero white" output operation. It may be observed that this modification simply involves the relative attenuation of the signal inputs to the respective "positive signal" potentiometers by a factor of two as compared with the signals applied to the "negative signal" potentiometers. To illustrate that the zero white condition is attained thereby, it may be noted that the output at terminal 60R of channel 10 for white information corresponds to the sum of two positive signals from potentiometers 13 and 15 and a negative signal from the potentiometer 11, the latter signal being twice the magnitude of each of the former signals with the result of mutual cancellation.

It should be noted that where the use of a particular camera or a change-over between particular camera requires or indicates the desirability of effecting some form of "masking," it may be convenient to perform the masking operation in the same matrixing network which is utilized for formation of the I and Q signals, for example. In such a case the advantage of simplification of procedure inherent in the present invention may be fully realized, if the I and Q forming matrix is in accordance with the principles of the embodiment illustrated in Figure 3.

It may generally be observed that, for whatever purpose matrixing is effected, the present invention greatly aids in simplifying adjusting procedures, and the simplification is particularly marked in cases where the propriety of adjustments is determined by the viewing of a reproduced image, as is often the case in laboratories and television studios at present.

It should also be appreciated that while in the foregoing explanation of the illustrated embodiments maintenance of a "constant white" output at both unity and zero levels were discussed, the principles of the present invention are generally applicable to the maintenance of a constant white output at any desired level. Thus, for example, if for purposes of effectively increasing apparent saturation it is desired to maintain the white output constant at some level intermediate unity and zero, the input signals applied to the "positive signal" potentiometers of each channel may be attenuated relative to the input signals applied to the "negative signal" potentiometers by a factor such as ¾, for example, rather than the factor of ½ required for zero output.

Having thus described my invention, what is claimed is:

1. In a color television system provided with a plurality of simultaneous component color signals, matrixing apparatus comprising the combination of means for adjustably mixing a first one of said plurality of component color signals with a second one of said component color signals, means for adjustably mixing said first component color signal with a third one of said component color signals, means for adjustably mixing said second component color signal with said third component color signal, and means for combining the outputs of said mixing means to provide an output signal, the amplitude of said output signal when said plurality of simultaneous color signals are substantially equal being independent of the adjustments of said mixing means.

2. Apparatus in accordance with claim 1 including means for controlling the relative polarities of the signal inputs to said mixing means such that a predetermined one of the mixing means provides an output of inverted polarity relative to the outputs of the other mixing means.

3. In a color television system provided with a plurality of simultaneous component color signals, a matrix network comprising the combination of a plurality of different matrix output channels, each of said channels including means for combining a first one of said component color signals with a second one of said component color signals, means for combining said first component color signal with a third one of said component color signals, means for combining said second component color signal with said third component color signal, each of said combining means being provided with means for adjusting the relative proportions of the two color signals being combined thereby, and means for adding together the outputs of all of said combining means to provide an output signal for said output channel, a different respective one of the combining means in each of said plurality of channels providing a signal output of inverted polarity relative to the outputs of the other combining means in said channels.

4. In a color television system provided with a plurality of simultaneous component color signals, a matrix network comprising the combination of a plurality of different matrix output channels, each of said channels including means for combining a first one of said component color signals with a second one of said component color signals, means for combining said first component color signal with a third one of said component color signal, means for combining said second component color signal with said third component color signal, each of said combining means being provided with means for adjusting the relative proportions of the two color signals being combined thereby, and means for adding together the outputs of all of said combining means to provide an output signal for said output channel, and means for adjusting polarities of the signal inputs to the combining means for the respective channels such that the combining means of said first-named type in one of said plurality of channels provides an output of inverted polarity relative to the outputs of the other combining means in said one channel, the combining means of said second-named type in a second one of said plurality of channels provides an output of inverted polarity relative to the outputs of the other combining means in said second channel, and the combining means of said third-named type in a third one of said plurality of channels provides an output of inverted polarity relative to the outputs of the other combining means in said third channel.

5. In a color television system provided with a source of a plurality of simultaneous component color signals representative of a color image, and including respective phase splitting means responsive to each of said component color signals, each of said phase splitting means being adapted to provide a pair of outputs respectively representative of the respective component color signal in a first polarity and in the opposite polarity, apparatus comprising the combination of a first voltage divider having a pair of fixed input terminals and an adjustable output terminal, means for applying a first one of said component color signals in said first polarity to one of the fixed terminals of said first voltage divider, means for applying a second one of said component color signals in said first polarity to the other fixed terminal of said first voltage divider, a second voltage divider also having a pair of fixed input terminals and an adjustable output terminal, means for applying said first component color signal in said first polarity to one of the fixed terminals of said second voltage divider, means for applying a third one of said component color signals in said first polarity to the other of the fixed terminals of said second voltage divider, a third voltage divider also having a pair of fixed input terminals and an adjustable output terminal, means for applying said second component color signal in said opposite polarity to one of the fixed terminals of said third voltage divider, means for applying said third component color signal in said opposite polarity to the other of said fixed terminals of said third voltage divider, and signal adding means coupled to the adjustable output terminals of said first, second and third voltage dividers.

6. In a color television system provided with a source of a plurality of simultaneous component color signals representative of a color image, and including respective phase splitting means responsive to each of said component color signals, each of said phase splitting means being adapted to provide a pair of outputs respectively representative of a respective component color signal in a first polarity and in the opposite polarity, matrixing apparatus comprising the combination of a plurality of different matrix output channels, each of said channels including a trio of adjustable voltage dividers, each adjustable voltage divider having a pair of input terminals and an output terminal; means for applying a first one of said component color signals in said first polarity to an input terminal of two of the voltage dividers in a first one of said channels, to an input terminal of one of the voltage dividers in a second of said channels, and to an input terminal of one of the voltage dividers in a third of said channels; means for applying said first component color signal in said opposite polarity to an input terminal of another of the voltage dividers in said second channel, and to an input terminal of another of the voltage dividers in said third channel; means for applying a second one of said component color signals in said first polarity to the other input terminal of a predetermined one of said two voltage dividers in said first-named channel, to the other input terminal of said one voltage divider and to an input terminal of the remaining voltage divider in said second channel, and to an input terminal of the remaining voltage divider in said third channel; means for applying said second component color signal in said opposite polarity to an input terminal of the remaining one of said voltage dividers in said first-named channel and to the other input terminal of the second-named voltage divider in said third channel; means for applying a third of said component color signals in said first polarity to the other input terminal of the remaining one of said two voltage dividers in said first channel, to the other input terminal of said voltage divider in said second channel, and to the other input terminals of the first-named and third-named voltage dividers in said third channel; means for applying said third color signal in said opposite polarity to the other input terminal of said remaining voltage divider in said first channel and to the other input terminal of the first-named voltage divider in said second channel; and signal adding means in each of said channels for combining the signals derived from the output terminals of the voltage dividers in said channel to provide a respective output signal.

7. In a color television system provided with a source of a plurality of simultaneous component color signals, said plurality of signals comprising respective red, blue and green component color signals of a first polarity, and corresponding red, blue and green component color signals of the opposite polarity, a masking amplifier comprising in combination a green signal masking channel including means for deriving from said source a mixture of the green and blue signals of said first polarity, means for deriving from said source a mixture of the green and red signals of said first ploarity, means for deriving from said source a mixture of the red and blue signals of said opposite polarity, each of said deriving means being provided with means for adjusting the relative proportions of the color signals in the respective derived mixture, and signal adding means coupled to the outputs of all said mixture deriving means for providing a masked green output signal.

8. A masking amplifier in accordance with claim 7 also including in combination a red signal masking channel including means for deriving from said source a mixture of the red and blue signals of said first polarity, means for deriving from said source a mixture of the red and green signals of said first polarity, means for deriving from said source a mixture of the green and blue signals of said opposite polarity, each of said deriving means being provided with means for adjusting the relative proportions of the color signals in the respective derived mixture, and signal adding means coupled to the outputs of all said mixture deriving means for providing a masked red output signal; and a blue signal masking channel including means for deriving from said source a mixture of the blue and green signals of said first polarity, means for deriving from said source a mixture of the blue and red signals of said first polarity, means for deriving from said source a mixture of the red and green signals of said opposite polarity, each of said deriving means being provided with means for adjusting the relative proportions of the color signals in the respective derived mixture, and signal adding means coupled to the outputs of all said mixture deriving means for providing a masked green output signal; the respective masked green, red and blue output signals being substantially equal to each other when said plurality of simultaneous component color signals are representative of picture white irrespective of the settings of said proportion adjusting means.

9. In a color television system provided with a source of a plurality of simultaneous component color signals representative of an image to be televised, said plurality of component color signals comprising respective red, blue and green color signals, a masking amplifier comprising in combination a green signal masking channel including means for forming a green plus blue signal of adjustable relative proportions, means for forming a green plus red signal of adjustable relative proportions, means for forming a red plus blue signal of adjustable relative proportions and inverted in phase relative to the green plus blue and green plus red signals, and means for combining the green plus blue, green plus red, and inverted phase red plus blue signals to provide a masked green output signal whereby the amplitude of the masked green output signal is independent of the adjustments of the relative proportions of the individual color signals in said green plus blue, green plus red, and red plus blue signals when said plurality of simultaneous component color signals are representative of white portions of said image.

10. In a color television system provided with a source of a plurality of simultaneous component color signals representative of an image to be televised, said plurality of component color signals comprising respective red, blue and green color signals, a masking amplifier comprising the combination of a green signal masking channel coupled to said source, a red signal masking channel coupled to said source, and a blue signal masking channel coupled to said source, said green signal masking channel including means for summing an adjustable mixture of said green and blue signals, an adjustable mixture of said green and red signals, and an adjustable mixture of said blue and red signals, the polarity of said latter adjustable mixture being opposite to the polarity of said first and second-named adjustable mixtures, said red signal masking channel including similar means for summing adjustable mixtures of the individual component color signals but wherein the first-named adjustable mixture is inverted in polarity relative to the polarity of the other two mixtures, and said blue signal masking channel also including similar means for summing adjustable mixtures of the individual component color signals but wherein said second-named mixture is inverted in polarity relative to the polarity of the other two mixtures.

11. In a masking amplifier for a color television system provided with a source of three different simultaneous component color signals, said masking amplifier including a separate masking channel for each of the component color signals, the masking channel for any given component color signal including means for combining with the given component color signal adjustable amounts of the other two component color signals to obtain a desired masked version of said given component color signal, the improvement comprising a potentiometer having a fixed input terminal at each end thereof and also having an adjustable tap, means for applying one of said other component color signals to one of said fixed input terminals, means for applying the remaining one of said other component color signals to the other one of said fixed input terminals, means for deriving a signal representing an adjustable mixture of said two other component color signals from said adjustable tap, and means for combining said adjustable mixture signal with said given component color signal to provide said masked version of said given component color signal.

References Cited in the file of this patent

UNITED STATES PATENTS

| | | |
|---|---|---|
| 2,215,708 | Miessner | Sept. 24, 1940 |
| 2,432,826 | Smith | Dec. 16, 1947 |
| 2,443,864 | MacAuley | June 22, 1948 |
| 2,461,645 | Kallmann | Feb. 15, 1949 |
| 2,485,665 | Sheperd | Oct. 25, 1949 |
| 2,590,950 | Eckert | Apr. 1, 1952 |
| 2,610,260 | Moffett | Sept. 9, 1952 |
| 2,651,673 | Fredendall | Sept. 8, 1953 |
| 2,706,265 | Buehler | Apr. 12, 1955 |
| 2,710,308 | Schade | June 7, 1955 |
| 2,737,628 | Haines | Mar. 6, 1956 |
| 2,745,900 | Parker | May 15, 1956 |

FOREIGN PATENTS

| | | |
|---|---|---|
| 1,010,787 | France | June 16, 1952 |